(12) United States Patent
Hori et al.

(10) Patent No.: US 7,670,498 B2
(45) Date of Patent: Mar. 2, 2010

(54) COOLANT COMPOSITION FOR FUEL CELL

(75) Inventors: Michihiro Hori, Gifu (JP); Hiroshi Egawa, Gifu (JP); Hidemi Kado, Gifu (JP); Tsuyumi Takashiba, Saitama (JP); Shiro Yagawa, Saitama (JP)

(73) Assignees: Honda Motor Co., Ltd. (JP); Shishiai-Kabushikigaisha (JP)

( * ) Notice: Subject to any disclaimer, the term of this patent is extended or adjusted under 35 U.S.C. 154(b) by 0 days.

(21) Appl. No.: 11/846,102

(22) Filed: Aug. 28, 2007

(65) Prior Publication Data

US 2008/0251756 A1 Oct. 16, 2008

Related U.S. Application Data

(63) Continuation-in-part of application No. PCT/JP2005/003522, filed on Mar. 2, 2005.

(51) Int. Cl.
 C09K 5/00 (2006.01)
 H01M 8/00 (2006.01)
(52) U.S. Cl. .................... 252/78.1; 252/71; 252/73; 252/77; 429/12; 429/120; 528/364
(58) Field of Classification Search ................ 252/73, 252/77, 78.1; 429/12, 120; 528/364
 See application file for complete search history.

(56) References Cited

U.S. PATENT DOCUMENTS

| | | | | |
|---|---|---|---|---|
| 3,891,450 A | * | 6/1975 | Trease | 106/31.64 |
| 4,108,830 A | * | 8/1978 | Kline | 524/219 |
| 4,128,530 A | * | 12/1978 | Cottman | 524/330 |
| 4,702,580 A | * | 10/1987 | Denner | 396/318 |
| 7,258,814 B2 | * | 8/2007 | Egawa et al. | 252/76 |
| 7,344,655 B1 | * | 3/2008 | Nishii et al. | 252/75 |
| 7,540,974 B2 | * | 6/2009 | Egawa et al. | 252/71 |
| 2004/0129920 A1 | * | 7/2004 | Wenderoth et al. | 252/71 |
| 2004/0245493 A1 | * | 12/2004 | Abe et al. | 252/71 |
| 2005/0109979 A1 | * | 5/2005 | Egawa et al. | 252/73 |
| 2005/0244692 A1 | * | 11/2005 | Egawa et al. | 429/26 |
| 2006/0145120 A1 | * | 7/2006 | Egawa et al. | 252/73 |
| 2007/0075289 A1 | * | 4/2007 | Egawa et al. | 252/73 |
| 2008/0035880 A1 | * | 2/2008 | Egawa et al. | 252/70 |
| 2008/0166615 A1 | * | 7/2008 | Egawa et al. | 429/26 |

FOREIGN PATENT DOCUMENTS

| | | | |
|---|---|---|---|
| JP | 60056971 A | * | 4/1985 |
| JP | 02138133 A | * | 5/1990 |
| JP | 2001-164244 A | | 6/2001 |
| JP | 2006-278199 A | * | 10/2006 |
| JP | 2007-246549 A | * | 9/2007 |

OTHER PUBLICATIONS

Japanese abstract of JP 02138133 A, Muraoka et al. May 1990.*
Japanese abstract of JP 60056971A, Akashi, Apr. 1985.*

* cited by examiner

*Primary Examiner*—Mark Eashoo
*Assistant Examiner*—Jane L Stanley
(74) *Attorney, Agent, or Firm*—Cantor Colburn LLP

(57) ABSTRACT

The present invention relates to a coolant composition for fuel cell coolant, comprised of sulfur containing alcohol or sulfur containing phenol having at least one sulfur atom per molecule, which effectively prevents increase of electric conductivity due to oxidation of its base component for a long time. The coolant composition when diluted with water to a predetermined concentration effectively suppresses increase of electric conductivity of the coolant and maintain fluctuation of electric conductivity within the range from 0 to 10 μS/cm so that power generation efficiency of the fuel cell may not be lowered.

10 Claims, No Drawings

COOLANT COMPOSITION FOR FUEL CELL

CROSS REFERENCE TO RELATED APPLICATIONS

This is a Continuation-In-Part Application of International Application No. PCT/JP2005/003522, filed on 2 Mar. 2005, the disclosure of which is incorporated herein by reference in its entirety.

TECHNICAL FIELD

The present invention relates to a coolant composition for fuel cells, in particular for vehicle fuel cells. More particularly, the present invention relates to a fuel cell coolant composition which effectively inhibits increase of electrical conductivity of fuel cell coolant due to oxidation of its base component in use over an extended period.

BACKGROUND ART

A fuel cell is typically formed in a stack structure where a plurality of unit cells are stacked one upon another. In use, heat is generated in the fuel cell. In order to cool the fuel cell, a cooling plate having a coolant passage is inserted every several unit cells. Coolant is circulated in the cooling plates through the coolant passages and cools the fuel cell.

If the electrical conductivity of the coolant is high, electricity generated in the fuel cell tends to partially leak into the coolant, resulting in waste of electricity and reduction of power. Therefore, pure water which is low in electric conductivity and thus highly insulative is typically used as fuel cell coolant.

However, when used in a vehicle fuel cell or a household cogeneration system, such fuel cell coolant will be cooled to the atmospheric temperature when the cell or the system is out of use and may be frozen at a temperature below zero, seriously damaging its cooling plates due to volumetric expansion of the coolant and greatly deteriorating the function of the fuel cell.

In order to prevent such freezing, glycol or alcohol may be blended in coolant as a base component. A fuel cell coolant comprised of water and glycol as a base component and an amine based alkaline additive has been proposed (Japanese Unexamined Patent Publication 2001-164244).

DISCLOSURE OF THE INVENTION

Object of the Invention

A conventional fuel cell coolant prepared of water and glycol or alcohol as its base component will be gradually oxidized in use, and ionic substances are formed in the coolant, gradually increasing electric conductivity of the coolant.

In order to address the above problem, fuel cell coolant may be provided with ion exchange resin within coolant passages of a fuel cell in order to remove ionic substances from the coolant and prevent increase of electric conductivity of the coolant.

However, the ion exchange resin will be quickly eaten up through the removal of the ionic substances which are produced due to oxidation of the base component of the coolant and lose its ion removal efficiency, the useful life of the ion exchange resin being quickly shortened.

Accordingly, it is an object of the present invention to provide a coolant composition for fuel cell coolant, which effectively inhibits increase of electric conductivity of fuel cell coolant due to oxidation of its base component over an extended period of time.

Means to Attain the Object

The fuel cell coolant composition of the present invention is characterized by comprising sulfur containing alcohol or sulfur containing phenol having at least one sulfur atom per molecule.

The base component of the fuel cell coolant composition of the present invention preferably has low electric conductivity and anti-freeze property, and comprises at least one component selected from water, alcohol, glycol and glycol ether.

The alcohol may be at least one component selected from methanol, ethanol, propanol, butanol, pentanol, hexanol, heptanol and octanol.

The glycol may be at least one component selected from ethylene glycol, diethylene glycol, triethylene glycol, propylene glycol, 1,3-propanediol, 1,3-butanediol and 1,5-pentanediol, hexylene glycol.

The glycol ether may be at least one component selected from ethylene glycol monomethyl ether, diethylene glycol monomethyl ether, triethylene glycol monomethyl ether, tetraethylene glycol monomethyl ether, ethylene glycol monoethyl ether, diethylene glycol monoethyl ether, triethylene glycol monoethyl ether, tetraethylene glycol monoethyl ether, ethylene glycol monobutyl ether, diethylene glycol monobutyl ether, triethylene glycol monobutyl ether and tetraethylene glycol monobutyl ether.

Among those, ethylene glycol and propylene glycol are preferred for their easiness of handling, relatively low prices and availability.

The base component includes sulfur containing alcohol or sulfur containing phenol having at least one sulfur atom per molecule. The sulfur containing alcohol and sulfur containing phenol are excellent in inhibiting oxidation of the base component. When the coolant composition of the present invention comprising such sulfur containing alcohol or sulfur containing phenol is diluted with water to an appropriate concentration and used as coolant, the electric conductivity of the coolant is kept from increasing (which would otherwise result by oxidation of the base component) or kept lower than 10 μS/cm (this range will not lower the electricity generation power of fuel cells). Fluctuation of electric conductivity is kept within the range 0 to 10 μS/cm even when the coolant is used for a long time.

The sulfur containing alcohol or sulfur containing phenol providing such effects has at least one sulfur atom per molecule and can be freely selected as long as it has at least one hydroxyl group. Such alcohol or phenol is preferably selected to have high dissolvability in the base component with a carbon number 1 to 20, and more preferably 1 to 10. Such sulfur containing alcohol or phenol preferably has a chain structure, and more preferably has a straight chain structure.

The sulfur containing alcohol or sulfur containing phenol may be at least one selected from 2-(methylthio) ethanol, 2-(ethylthio) ethanol, 2-(n-propylthio)ethanol, 2-(isopropylthio)ethanol, 2-(n-butylthio)ethanol, 2-(isobutylthio)ethanol, 2-(phenylthio)ethanol, 2-mercaptoethanol, 2,2'-dithiodiethanol, 2-(2-aminoethylthio)ethanol, 3-(ethylthio)propanol, 2,3-dimercaptopropanol, 3-mercapto-1,2-propanediol, 4-(methylthio)butanol, 3-mercapto-2-butanol, 3-(methylthio)hexanol, 3-mercapto-l-hexanol, 2-thiophenemethanol, 3-thiophenemethanol, 2-thiopheneethanol, 3-thiopheneethanol, DL-dithiothreitol, L-dithiothreitol, dithioerythritol, 4-(methylthio) -6-(hydroxymethyl)-o-cresol, methionol, DL-methioninol, L-methioninol, thiodiglycol, 6-hydroxy-1,3-benzoxathiol-2-on, 2-mercaptobenzylalcohol, 4-mercaptobenzylalcohol, 4-(methylthio)benzylalcohol, 4-hydroxythiophenol, 4,4'-thiodiphenol, 3,6-dithia-1,8-octanediol, 3,7-dithia-1,9-nonanediol and 3,6-dioxa-8-mercaptooctane-1-ol.

The sulfur containing alcohol or sulfur containing phenol may advantageously have a structure where the terminal group of molecule is non-sulfur atoms.

Such sulfur containing alcohol or sulfur containing phenol may be at least one selected from 2-(methylthio) ethanol, 2-(ethylthio) ethanol, 2-(n-propylthio)ethanol, 2-(isopropylthio)ethanol, 2-(n-butylthio)ethanol, 2-(isobutylthio)ethanol, 2-(phenylthio)ethanol, 2,2'-dithiodiethanol, 2-(2-aminoethylthio)ethanol, 3-(ethylthio)propanol, 4-(methylthio) butanol, 3-(methylthio)hexanol, 2-thiophenemethanol, 3-thiophenemethanol, 2-thiopheneethanol, 3-thiopeheneethanol, 4-(methylthio)-6-(hydroxymethyl)-o-cresol, methionol, DL-methioninol, L-methioninol, thiodiglycol, 6-hydroxy-1,3-benzoxathiol-2-on, 4-(methylthio)benzylalcohol, 4,4'-thiodiphenol, 3,6-dithia-1,8-octanediol and 3,7-dithia-1,9-nonanediol.

The sulfur containing alcohol or sulfur containing phenol may preferably be included within the range from 0.01 part by weight to 20 parts by weight against 100 parts by weight of the base component. The content below this range will not provide sufficient base oxidation prevention while the content above this range will not provide the extra effect and will only be wasteful.

The sulfur containing alcohol or sulfur containing phenol may be used as a base itself to provide a coolant composition which is excellent in oxidation prevention and prevents increase of electric conductivity by oxidation of the base component.

The coolant composition of the present invention may additionally comprise at least one corrosion inhibitor without affecting electric conductivity so as to inhibit metal corrosion in fuel cells.

Such corrosion inhibitor may be selected from phosphoric acid and salts thereof, aliphatic carboxylic acid and salts thereof, aromatic carboxylic acid and salts thereof, triazole, thiazole, silicate, nitrate, nitrite, borate, molybdate and amine salts.

The phosphoric acid and salts thereof may be selected from orthophosphoric acid, pyrophosphoric acid, hexamethaphosphoric acid, tripolyphosphoric acid and their alkali metal salts. The alkali metal salts may preferably be sodium salts and potassium salts.

The aliphatic carboxylic acid and salts thereof may be selected from pentanoic acid, hexanoic acid, heptanoic acid, octanoic acid, nonanoic acid, decanoic acid, 2-ethyl hexanoic acid, adipic acid, suberic acid, azelaic acid sebacic acid, undecanoic acid, dodecanedioic acid and their alkali metal salts. The alkali metal salts may preferably be sodium salts and potassium salts.

The aromatic carboxylic acid and salts thereof may be selected from benzoic acid, toluic acid, paratertiary butylbenzoic acid, phthalic acid, paramethoxybenzoic acid, cinnamic acid and their alkali metal salts. The alkali metal salts may preferably be sodium salts and potassium salts.

The triazole may be selected from benzotriazole, methylbenzotriazole, cyclobenzotriazole, and 4-phenyl-1,2,3-triazole.

The thiazole may be selected from mercaptobenzothiazole and alkali metal salts thereof. The alkali metal salts may preferably be sodium salts and potassium salts.

The silicate may be selected from sodium salts and potassium salts of metasilicic acid as well as aqueous solutions of sodium silicate called "water glass" represented by $Na_2O/XSiO_2$ (X: 0.5 to 3.3). The nitrate may be selectively sodium nitrate and potassium nitrate. The nitrite may be selected from sodium nitrite and potassium nitrite. The borate may be selectively sodium tetraborate and potassium tetraborate.

The molybdate may be selected from sodium molybdate, potassium molybdate and ammonium molybdate. The amine salts may be selected from monoethanolamine, diethanolamine, triethanolamine, monoisopropanolamine, diisopropanolamine and triisopropanolamine.

A pH adjustor such as sodium hydroxide and potassium hydroxide, an antifoaming agent and a coloring agent may be additionally and selectively included in the coolant composition of the present invention without affecting electric conductivity of the coolant.

The scope of the present invention is not limited by the following embodiments. These embodiments can be modified within the scope of the appended claims.

Effects of the Invention

The coolant composition of the present invention comprises sulfur containing alcohol or sulfur containing phenol having at least one sulfur atom per molecule, which for long prevents increase of electric conductivity of fuel cell coolant (which would otherwise result by oxidation of the base component of the coolant) and keeps fluctuation of electric conductivity of the coolant within the range 0 to 10 µS/cm such that the power generation efficiency may not be deteriorated.

BEST MODE FOR CARRYING OUT THE INVENTION

In the following, some preferred embodiments of the coolant composition of the present invention are described in comparison with conventional coolant compositions as comparatives. Table 1 shows the components of Embodiments 1 to 6 and Comparatives 1 to 4, respectively. Each composition contained ion exchange water (deionized water) and ethylene glycol as its base component. Embodiment 1 additionally contained 2-(methylthio) ethanol. Embodiment 2 additionally contained 2-(ethylthio)ethanol, Embodiment 3 additionally contained 2-(n-butylthio)ethanol, Embodiment 4 additionally contained 2-(phenylthio)ethanol, Embodiment 5 additionally contained thiodiglycol, and Embodiment 6 additionally contained 3,7-dithia-1,9-nonanediol while Comparative 1 contained no such additives, Comparative 2 additionally contained ethanol, Comparative 3 additionally contained 1-propanol, and Comparative 4 additionally contained phenyl sulfoxide.

TABLE 1

| Component | Components (wt %) | | | | | | | | | |
|---|---|---|---|---|---|---|---|---|---|---|
| | Embodiment | | | | | | Comparative | | | |
| | 1 | 2 | 3 | 4 | 5 | 6 | 1 | 2 | 3 | 4 |
| Ethylene glycol | 50 | 50 | 50 | 50 | 50 | 50 | 50 | 50 | 50 | 50 |
| Deionized water | 50 | 50 | 50 | 50 | 50 | 50 | 50 | 50 | 50 | 50 |
| 2-(methylthio)ethanol | 1.0 | — | — | — | — | — | — | — | — | — |
| 2-(ethylthio)ethanol | — | 1.0 | — | — | — | — | — | — | — | — |
| 2-(n-butylthio)ethanol | — | — | 0.2 | — | — | — | — | — | — | — |
| 2-(phenylthio)ethanol | — | — | — | 1.0 | — | — | — | — | — | — |
| Thiodiglycol | — | — | — | — | 1.0 | — | — | — | — | — |
| 3,7-dithia-1,9-nonanediol | — | — | — | — | — | 1.0 | — | — | — | — |
| Ethanol | — | — | — | — | — | — | — | 1.0 | — | — |
| 1-propanol | — | — | — | — | — | — | — | — | 1.0 | — |
| Phenyl sulfoxide | — | — | — | — | — | — | — | — | — | 1.0 |

The acid content and the electric conductivity (μS/cm) of each of Embodiments 1 to 6 and Comparatives 1 to 4 after the oxidation deterioration test were measured. The measurements are shown in Table 2. The oxidation deterioration test was carried out at 100° C. for 500 hours.

TABLE 2

| Measured Objects | | Test Results | | | | | | | | | |
|---|---|---|---|---|---|---|---|---|---|---|---|
| | | Embodiment | | | | | | Comparative | | | |
| | | 1 | 2 | 3 | 4 | 5 | 6 | 1 | 2 | 3 | 4 |
| Electrical Conductivity (μS/cm) | Initial | 0.5 | 0.5 | 0.3 | 1.3 | 0.1 | 0.9 | 0.2 | 0.3 | 0.3 | 0.6 |
| | After test | 8.3 | 3.0 | 5.0 | 7.6 | 6.9 | 5.1 | 111 | 103 | 105 | 115 |
| Acid (mmol/l) | Initial | 0 | 0 | 0 | 0 | 0 | 0 | 0 | 0 | 0 | 0 |
| | After test | Trace | Trace | Trace | Trace | Trace | Trace | 22 | 22 | 27 | 27 |

Table 2 shows that after the oxidation deterioration test the acid content and electric conductivity of Comparative 1 which contains no alcohol or phenol having at least one sulfur atom per molecule were 22 mmol/l and 111 μS/cm respectively, while those of Comparatives 2 to 4 were 22 to 27 mmol/l and 103 to 115 μS/cm respectively, indicating that Comparative 1 having no oxidation preventive power and Comparatives 2 to 4 were practically identical in properties. On the other hand, Embodiments 1 to 6 produced only traces of acids through the test and their electric conductivities after the test were as small as 3.0 to 8.3 μS/cm. Thus, it was confirmed that increase of electric conductivity was effectively suppressed by containing sulfur comprising alcohol or sulfur containing phenol.

The invention claimed is:

1. A coolant composition for fuel cells comprising a sulfur containing alcohol disposed in a base solvent, wherein the sulfur containing alcohol has a structure where terminal groups of the structure do not contain a sulfur atom and wherein the sulfur containing alcohol is blended in the base solvent selected from water, alcohol, glycol, glycol ether and mixtures thereof.

2. The coolant composition according to claim 1, wherein the number of carbons in the sulfur containing alcohol is 1 to 20.

3. The coolant composition according to claim 2, wherein the sulfur containing alcohol keeps the fluctuation of electric conductivity of the fuel cell coolant within the range from 0.1 to 10μS/cm.

4. The coolant composition according to claim 2, wherein the sulfur containing alcohol is at least one selected from the group consisting of 2-(methylthio)ethanol, 2-(ethylthio)ethanol, 2-(n-propylthio)ethanol, 2-(isopropylthio)ethanol, 2-(n-butylthio)ethanol, 2-(isobutylthio)ethanol, 2-(phenylthio)ethanol, 2,2'-dithiodiethanol, 2-(2-aminoethylthio)ethanol, 3-(ethylthio)propanol, 4-(methylthio)butanol, 3-(methylthio)hexanol, 2-thiophenemethanol, 3-thiophenemethanol, 2-thiopheneethanol, 3-thiopheneethanol, -methionol, DL-methioninol, L-methioninol, thiodiglycol, 6-hydroxy-1,3-benzoxathiol-2-on, 4-(methylthio)benzylalcohol, 3,6-dithia-1,8-octanediol and 3,7-dithia-1,9-nonanediol.

5. The coolant composition according to claim 4, wherein the sulfur containing alcohol keeps the fluctuation of electric conductivity of the fuel cell coolant within the range from 0.1 to 10 μS/cm.

6. The coolant composition according to claim 1, wherein the sulfur containing alcohol is included at 0.01 to 20 parts by weight against 100 parts by weight of the base solvent.

7. The coolant composition according to claim 6, wherein the sulfur containing alcohol keeps the fluctuation of electric conductivity of the fuel cell coolant within the range from 0.1 to 10 μS/cm.

8. The coolant composition according to claim 1, wherein the sulfur containing alcohol keeps the electric conductivity of the fuel cell coolant below 10 μS/cm.

9. The coolant composition according to claim 8, wherein the sulfur containing alcohol keeps the fluctuation of electric conductivity of the fuel cell coolant within the range from 0.1 to 10 μS/cm.

10. The coolant composition according to claim 1, wherein the sulfur containing alcohol keeps the fluctuation of electric conductivity of the fuel cell coolant within the range from 0.1 to 10 μS/cm.

\* \* \* \* \*